United States Patent
Yoshioka et al.

(10) Patent No.: US 12,076,716 B2
(45) Date of Patent: Sep. 3, 2024

(54) HONEYCOMB FILTER

(71) Applicant: NGK Insulators, Ltd., Nagoya (JP)

(72) Inventors: Fumihiko Yoshioka, Novi, MI (US); Yudai Kurimoto, Shanghai (CN)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 18/173,911

(22) Filed: Feb. 24, 2023

(65) Prior Publication Data

US 2023/0311111 A1 Oct. 5, 2023

(30) Foreign Application Priority Data

Mar. 29, 2022 (JP) ................. 2022-052934

(51) Int. Cl.
- *B01D 46/24* (2006.01)
- *B01D 53/94* (2006.01)
- *B01J 35/56* (2024.01)
- *F01N 3/28* (2006.01)

(52) U.S. Cl.
CPC ........ *B01J 35/56* (2024.01); *B01D 46/24491* (2021.08); *B01D 46/2474* (2013.01); *B01D 46/2482* (2021.08); *B01D 46/2484* (2021.08); *B01D 46/249* (2021.08); *B01D 53/94* (2013.01); *F01N 3/2803* (2013.01); *B01D 2255/9155* (2013.01); *B01D 2259/4566* (2013.01); *B01D 2279/30* (2013.01); *F01N 2330/32* (2013.01); *F01N 2330/48* (2013.01)

(58) Field of Classification Search
None
See application file for complete search history.

(56) References Cited

U.S. PATENT DOCUMENTS

| | | | |
|---|---|---|---|
| 2004/0123573 A1* | 7/2004 | Ichikawa | B01D 46/249 55/523 |
| 2004/0258582 A1* | 12/2004 | Miwa | F01N 3/0222 422/177 |
| 2005/0235622 A1* | 10/2005 | Cutler | B01D 46/2429 55/523 |
| 2016/0346776 A1* | 12/2016 | Omiya | F01N 3/2828 |
| 2018/0080355 A1* | 3/2018 | Ishihara | B01D 46/247 |
| 2018/0264453 A1 | 9/2018 | Kuki | |
| 2019/0300446 A1* | 10/2019 | Kasai | B01D 46/2476 |

FOREIGN PATENT DOCUMENTS

JP 2018-149510 A 9/2018

* cited by examiner

*Primary Examiner* — Mary I Omori
(74) *Attorney, Agent, or Firm* — BURR PATENT LAW, PLLC

(57) ABSTRACT

A honeycomb filter includes: a honeycomb structure having porous partition walls disposed so as to surround cells, and plugging portions disposed at any one of ends on the inflow end face and the ends on the outflow end face, of cells. In a cross section perpendicular to an extending direction of the cells, a thickness T1 of the partition walls in a central portion including a center of gravity O of the cross section is 0.17 to 0.32 mm, a thickness T2 of the partition walls in an outer peripheral portion is 70 to 90% of the thickness T1, and the outer peripheral portion extends from an outer peripheral edge of the cross section of honeycomb structure by 6 to 12% of a radius r which is from the center of gravity O of the cross section to the outer peripheral edge.

1 Claim, 4 Drawing Sheets

HONEYCOMB FILTER

RELATED APPLICATIONS

The present application is an application based on JP 2022-052934 filed on Mar. 29, 2022 with Japan Patent Office, the entire contents of which are incorporated herein by reference.

BACKGROUND OF THE INVENTION

Field of the Invention

The present invention relates to a honeycomb filter. More specifically, the present invention relates to a honeycomb filter having low pressure loss and capable of achieving excellent purification performance when an exhaust gas purifying catalyst is loaded.

Description of the Related Art

Conventionally, a honeycomb filter using honeycomb structure has been known as a device for trapping a particulate matter in a exhaust gas discharged from an internal combustion engine such as an engine of an automobile, or a device for purifying toxic gaseous components such as CO, HC and NOx (see Patent Document 1). The honeycomb structure includes partition walls made of porous ceramics such as cordierite and a plurality of cells defined by the partition walls. A honeycomb filter includes such a honeycomb structure provided with plugging portions so as to plug open ends on the inflow end face and the outflow end face of the plurality of cells alternately. In other words, a honeycomb filter has inflow cells that are open on the inflow end face and are plugged on the outflow end face and outflow cells that are plugged on the inflow end face and are open on the outflow end face, and these inflow cells and outflow cells are disposed alternately via the partition walls. In the honeycomb filter, the porous partition walls serve as a filter for trapping particulate matter in exhaust gas. Hereinafter, particulate matter included in exhaust gas may be referred to as "PM". "PM" is an abbreviation for "particulate matter."

Purifying of exhaust gas by the honeycomb filter is performed as follows. First, the honeycomb filter is arranged such that its inflow end face is located upstream of exhaust system from which exhaust gas is discharged. Exhaust gas flows into the inflow cells from the inflow end face of the honeycomb filter. Exhaust gas flowing into the inflow cells passes through the porous partition walls, flows into the outflow cells, and is discharged from the outflow end face of the honeycomb filter. When passing through the porous partition walls, PM or the like in exhaust gas is trapped and removed. In addition, such honeycomb filters may load an oxidation catalyst for promoting oxidation (burning) of PM and an exhaust gas purifying catalyst for purify harmful components such as NOx, and the like.

[Patent Document 1] JP 2018-149510

However, when a honeycomb filter is arranged to remove PM generated from an engine of an automobile, there is a problem that pressure loss increases.

Further, if PM in exhaust gas is continuously removed by a honeycomb filter, PM is deposited inside the honeycomb filter, and pressure loss of the honeycomb filter increases. Therefore, a purifying device in which a honeycomb filter is used is configured to burn the accumulated PM inside the honeycomb filter automatically or manually to avoid an excessive pressure loss of the honeycomb filter. Hereinafter, the operation to burn the PM accumulated inside a honeycomb filter may be called "regeneration operation" of the honeycomb filter. Such regeneration operation of a honeycomb filter forcibly burns the PM accumulated inside the honeycomb filter, so that the temperature inside the honeycomb filter rises. Therefore, if heat capacity of the honeycomb filter is too small, the honeycomb filter may be damaged due to heat generated during regeneration process.

As a method of reducing pressure loss of the honeycomb filter, there is a method of reducing the thickness of the partition walls. On the other hand, as a method of increasing heat capacity of the honeycomb filter, there is a method of increasing the thickness of the partition walls. However, when the thickness of the partition walls is reduced, there is a problem that trapping performance for PM is deteriorated since the thickness of the partition walls functioning as a filtering medium is reduced. On the other hand, when the thickness of the partition walls is increased, there is a problem that pressure loss of the honeycomb filter is increased, and another problem that when various catalysts such as an exhaust gas purifying catalyst are load, early activation of the catalyst is inhibited due to an increase in weight, and it is difficult to obtain adequate purification performance due to the catalytic reaction.

The present invention has been made in view of the problems described above that the prior arts have. According to the present invention, a honeycomb filter having low pressure loss, and capable of achieving excellent purification performance when an exhaust gas purifying catalyst is loaded is provided.

SUMMARY OF THE INVENTION

According to the present invention, a honeycomb filter described below is provided.

[1] A honeycomb filter including:
a honeycomb structure that is pillar-shaped and has porous partition walls disposed so as to surround a plurality of cells each of which serves as a fluid through channel extending from an inflow end face of the honeycomb structure to an outflow end face of the honeycomb structure, and plugging portions that are disposed at any one of ends on the inflow end face and ends on the outflow end face, of the plurality of cells, wherein, in a cross section perpendicular to an extending direction of the plurality of cells, the honeycomb structure includes a central portion including a center of gravity O of the cross section, and an outer peripheral portion located outside of the central portion, a thickness T1 of the partition walls in the central portion is 0.17 to 0.32 mm, a thickness T2 of the partition walls in the outer peripheral portion is 70 to 90% of the thickness T1 of the partition walls in the central portion, and the outer peripheral portion extends from an outer peripheral edge of the cross section of honeycomb structure by 6 to 12% of a radius r which is from the center of gravity O of the cross section to the outer peripheral edge.

[2] The honeycomb filter according to claim 1, wherein the honeycomb structure has a cell density of 30 to 63 cells/cm$^2$.

[3] The honeycomb filter according to claim 1 or 2, wherein a porosity of the partition walls is 45 to 65%.

The honeycomb filter of the present invention has low pressure loss, and is capable of achieving excellent purification performance when an exhaust gas purifying catalyst is loaded.

DESCRIPTION OF THE PREFERRED EMBODIMENTS

The following will describe embodiments of the present invention; however, the present invention is not limited to the following embodiments. Therefore, it should be understood that those created by adding changes, improvements or the like to the following embodiments, as appropriate, on the basis of the common knowledge of one skilled in the art without departing from the spirit of the present invention are also covered by the scope of the present invention.

Figure 1:
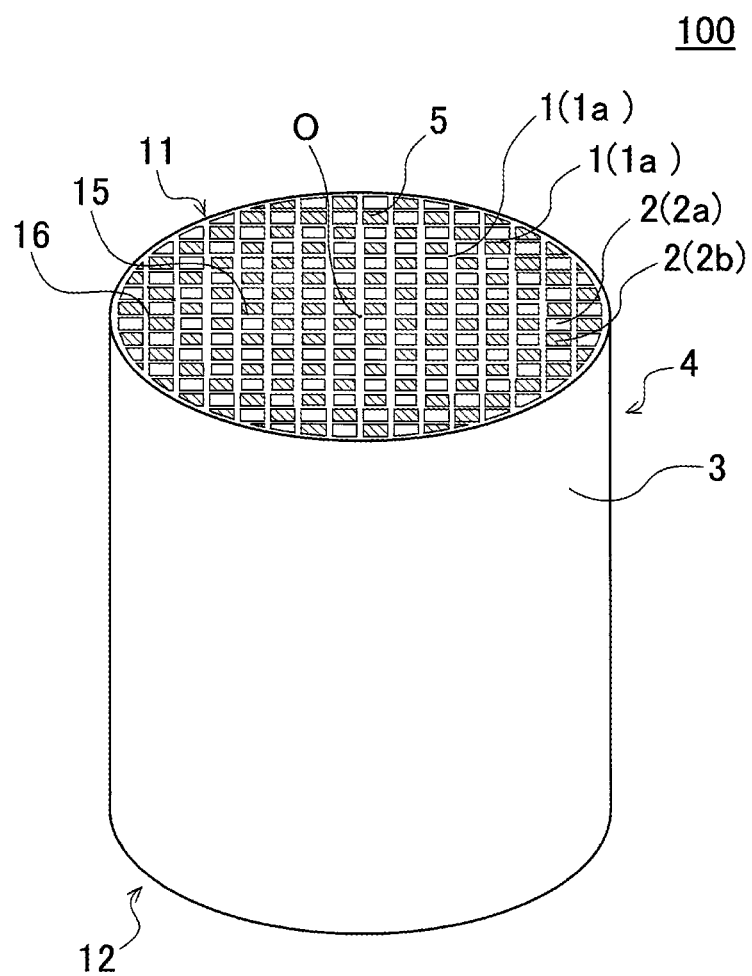
FIG. 1 is a perspective view schematically showing an embodiment of a honeycomb filter according to the present invention.
Figure 2:
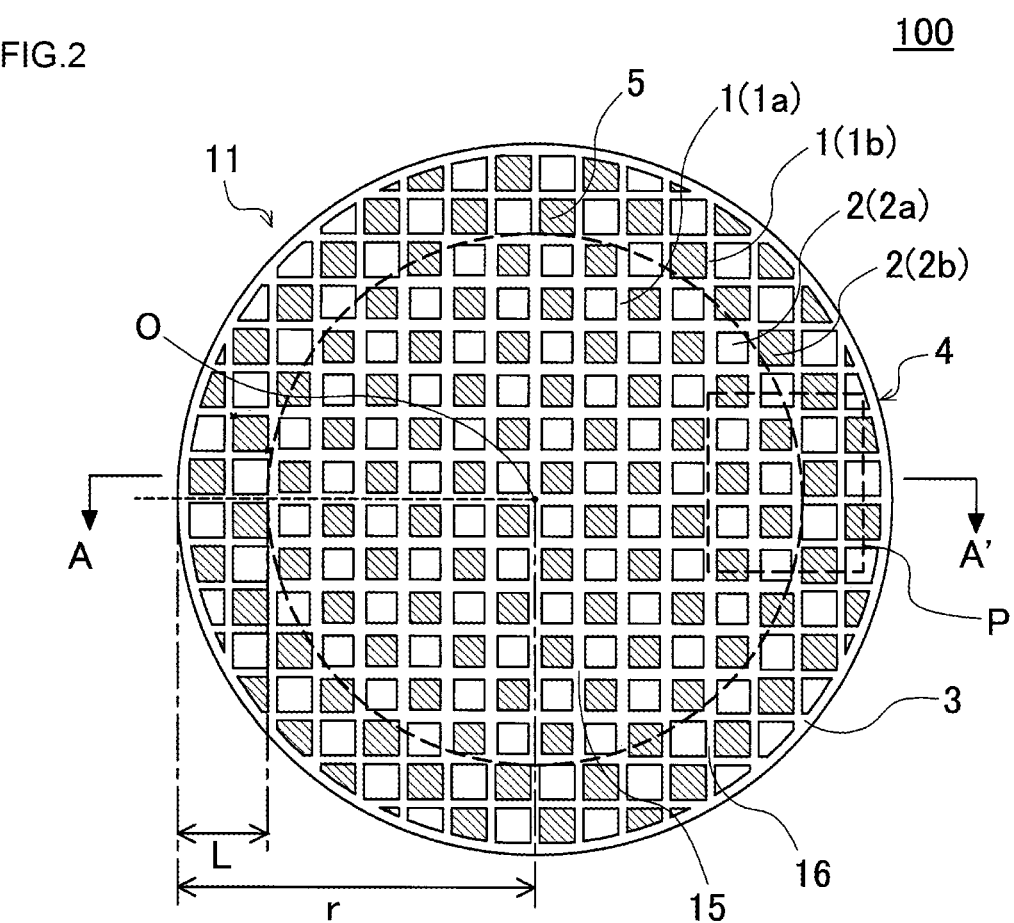
FIG. 2 is a plan view showing an inflow end face of the honeycomb filter shown in FIG. 1.
Figure 3:
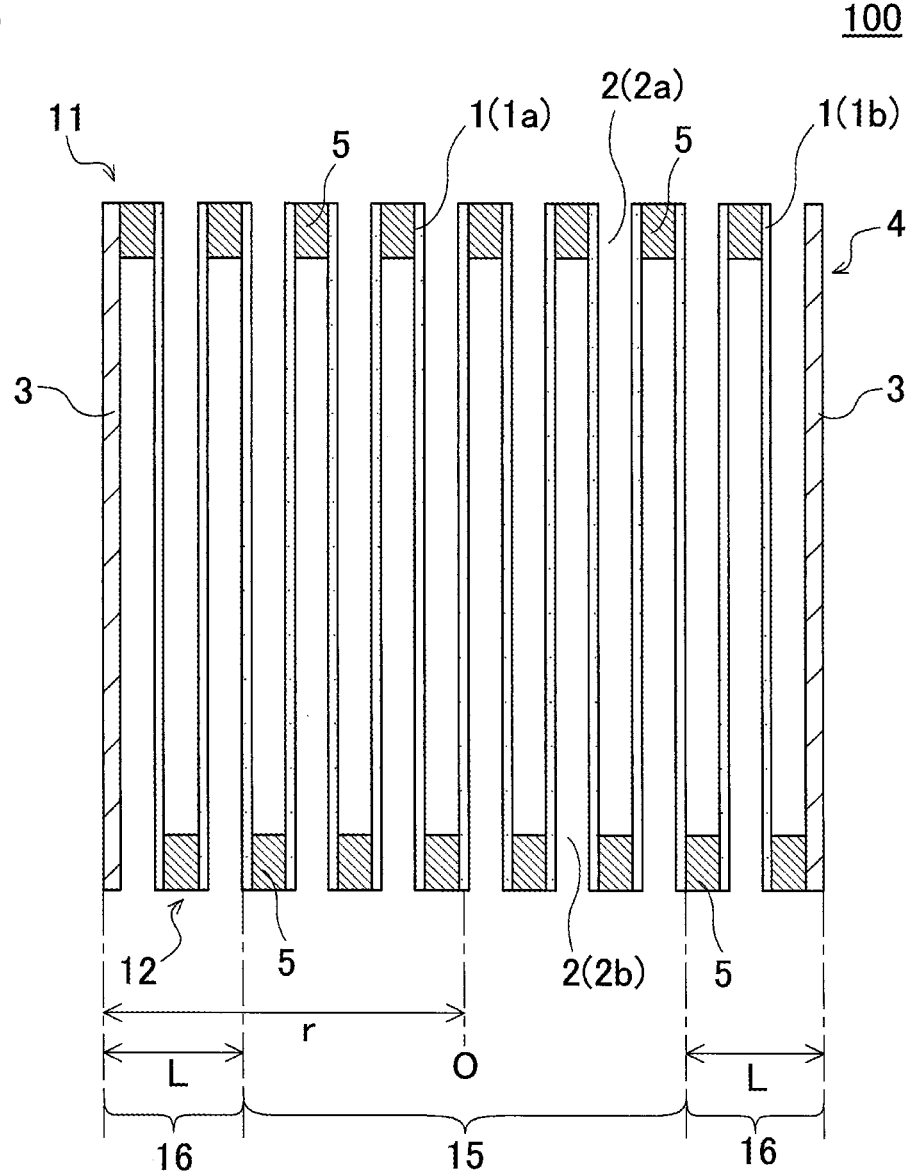
FIG. 3 is a cross-sectional view schematically showing an A-A' cross section of FIG. 2.
Figure 4:
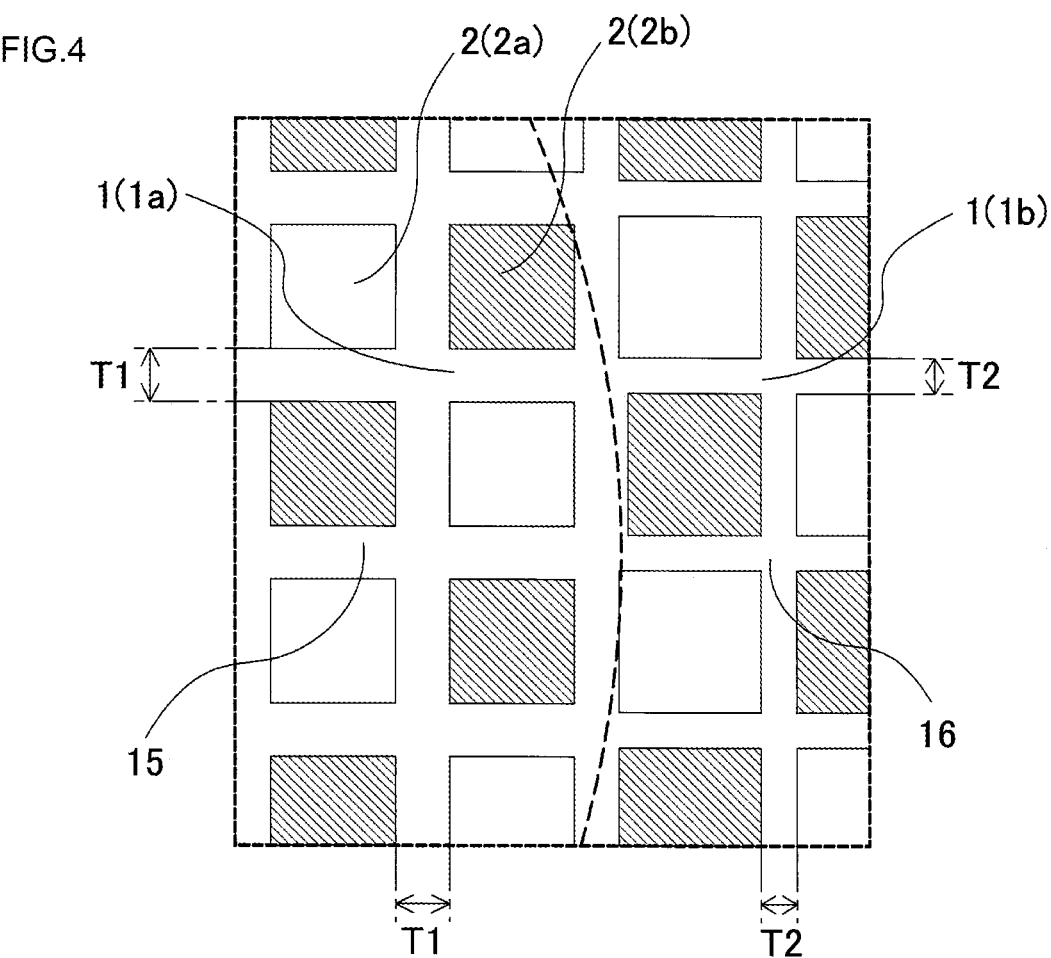
FIG. 4 is an enlarged plan view of a region surrounded by a broken line indicated by P in FIG. 2.

(1) Honeycomb Filter:

An embodiment of the present honeycomb filter is a honeycomb filter 100 as shown in FIGS. 1 to 4. Here, FIG. 1 is a perspective view schematically showing an embodiment of a honeycomb filter according to the present invention. FIG. 2 is a plan view showing an inflow end face of the honeycomb filter shown in FIG. 1. FIG. 3 is a cross-sectional view schematically showing an A-A' cross section of FIG. 2. FIG. 4 is an enlarged plan view of a region surrounded by a broken line indicated by P in FIG. 2.

As shown in FIGS. 1 to 4, the honeycomb filter 100 of the present embodiment includes a honeycomb structure 4 and plugging portions 5. The honeycomb structure 4 has a pillar shape, and has porous partition walls 1 that surround a plurality of cells 2 each of which extends from an inflow end face 11 to an outflow end face 12 of the honeycomb structure 4 and serves as a through channel of fluid. In the honeycomb filter 100, the honeycomb structure 4 has a pillar shape, and further includes a circumferential wall 3 on a circumferential surface thereof. In other words, the circumferential wall 3 is provided to encompass the partition walls 1 provided in a grid pattern.

The plugging portions 5 are disposed at open ends on the inflow end face 11 or the outflow end face 12, of the cells 2. In the honeycomb filters 100 shown in FIGS. 1 to 4, the plugging portion 5 are disposed at the open ends of the predetermined cells 2 on the inflow end face 11 and the open ends of the remaining cells 2 on the outflow end face 12, respectively. The cells 2 having the plugging portions 5 disposed at the open ends on the outflow end face 12 are defined as inflow cells 2a. Further, the cells 2 having the plugging portions 5 disposed at the open ends on the inflow end face 11 are defined as outflow cells 2b. The inflow cells 2a and the outflow cells 2b are preferably arranged alternately with the partition walls 1 interposed therebetween. This, in addition, preferably forms a checkerboard pattern by the plugging portions 5 and "the open ends of the cells 2" on both end faces of the honeycomb filter 100.

In a cross section perpendicular to the extending direction of the cells 2, the honeycomb structure 4 includes a central portion 15 including a center of gravity O of the cross section, and an outer peripheral portion 16 located outside of the central portion 15. For example, as shown in FIGS. 2 and 3, a certain range extending from the center of gravity O toward the outer periphery which includes the center of gravity O of the cross section of honeycomb structure 4 is the "central portion 15", and a range closer to the outer periphery than the central portion 15 is the "outer peripheral portion 16".

The honeycomb filter 100 of the present embodiment has particularly major properties in a configuration of the partition walls 1 in the central portion 15 and the outer peripheral portion 16. That is, in the honeycomb filter 100 of the present embodiment, a thickness T1 of the partition walls 1 in the central portion 15 is 0.17 to 0.32 mm, and a thickness T2 of the partition walls 1 in the outer peripheral portion 16 is 70 to 90% of the thickness T1 of the partition walls 1 in the central portion 15. Here, the outer peripheral portion 16 extends from an outer peripheral edge of the cross section of honeycomb structure 4 by 6 to 12% of the radius r which is from the center of gravity O of the cross section to the outer peripheral edge. With such a configuration, it is possible to realize low pressure loss and excellent purification performance when an exhaust gas purifying catalyst is loaded. That is, by reducing the thickness T2 of the partition walls 1 in the outer peripheral portion 16 than the thickness T1 of the partition walls 1 in the central portion 15, a weight of the honeycomb filter 100 becomes lighter, and excellent purification performance can be realized when exhaust gas purifying catalyst is loaded. Further, by reducing the thickness T2 of the partition walls 1 in the outer peripheral portion 16, an open frontal area of the cells 2 in the honeycomb filter 100 is increased, and pressure loss can be expected to be reduced. On the other hand, by setting the thickness T1 of the partition walls 1 in the central portion 15 to be 0.17 to 0.32 mm, it is possible to effectively suppress deterioration of trapping performance for PM.

The partition walls 1 thickness T1 in the central portion 15 and the partition walls 1 thickness T2 in the outer peripheral portion 16 can be measured using, for example, a scanning electron microscope or a microscope (microscope). If the shape of the cells 2 is a polygon, the thickness of the partition walls 1 at the position corresponding to the midpoint of one side of the polygon is measured when the thicknesses T1 and T2 of the partition walls 1 are measured. Specifically, the thickness T1 of the partition walls 1 in the central portion 15 can be determined by the following method. First, in a cross section perpendicular to the extending direction of the cells 2 of the honeycomb structure 4, the thickness of the partition walls 1 ranging from 50% to 100% of the radius r which is from the center of gravity O of the cross section to the outer peripheral edge is measured at a total of 10 points every 5% of the radius r, starting from the outer peripheral edge of the cross section. An average of the thicknesses of the partition walls 1 measured at the 10 points in this way is defined as the "thickness T1 of the partition walls 1 in the central portion 15". Next, the boundary between the central portion 15 and the outer peripheral portion 16 is defined as follows. First, the thickness of the partition walls 1 is measured every 1% of the radius r from the outer peripheral edge of the cross section of honeycomb structure 4, and a measurement point (measurement position) previous to the first measurement point where the thickness of the partition walls 1 exceeds 90% of the thickness of T1 for the first time is defined as a "boundary between the central portion 15 and the outer peripheral portion 16". After the boundary between the central portion 15 and the outer peripheral portion 16 is defined in this manner, the thickness of the partition walls 1 in the outer peripheral portion 16 is measured every 1% of the radius r from the outer peripheral edge of the cross section, and an average thereof is defined as the "thickness T2 of the partition walls 1 in the outer peripheral portion 16". Hereinafter, the partition walls 1 in the outer peripheral portion 16 may be referred to as "outer peripheral partition walls 1b". Further, the partition walls 1 in the central portion 15 may be referred to as "central partition walls 1a". The thickness T2 of the partition walls 1b is preferably substantially constant in the outer peripheral portion 16. The thickness T1 of the central partition walls 1a is also preferably substantially constant in the central portion 15. For example, the thickness T2 of the outer peripheral partition walls 1b is preferably within ±0.012 mm within the outer peripheral portion 16. The thickness T1 of the central partition walls 1a is preferably within ±0.012 mm in the central portion 15.

The thickness T1 of the central partition walls 1a may be 0.17 to 0.32 mm, but is preferably, for example, 0.20 to 0.30 mm, and more preferably 0.20 to 0.28 mm. For example, if the thickness T1 of the central partition walls 1a is too thin, trapping performance for PM may be deteriorated. On the other hand, if the thickness T1 of the center the partition walls 1a is too thick, pressure loss increases.

The thickness T2 of the outer peripheral partition walls 1b may be 70 to 90% of the thickness T1 of the central partition walls 1a, but is preferably 73 to 90%, and more preferably 75 to 90%. If the thickness T2 of the partition walls 1b is less than 70% of the thickness T1 of the central partition walls 1a, the thickness T1 of the central partition walls 1a is so thin that contacting areas with the catalyst when exhaust gas permeates through the partition walls 1 are too small and purification performance cannot be expected to be improved. On the other hand, when the thickness T2 of the outer peripheral partition walls 1b exceeds 90% of the thickness T1 of the central partition walls 1a, the weight of the honeycomb filter 100 does not sufficiently decrease, and purification performance cannot be sufficiently improved. In addition, an open frontal area of the cells 2 in the honeycomb filter 100 decreases, and pressure loss also increases.

The outer peripheral portion 16 extends from the outer peripheral edge of the cross section of honeycomb structure 4 by 6 to 12% of the radius r which is from the center of gravity O of the cross section to the outer peripheral edge. When the range of the outer peripheral portion 16 is other than the above numerical range, it is difficult to achieve both low pressure loss and high purification performance. Here, the "center of gravity O" of the cross section of honeycomb structure 4 means a center of gravity in the geometric sense of the cross section (in other words, a geometric center).

The cell density of honeycomb structure 4 is preferably 30 to 63 cells/cm', more preferably 30 to 62 cells/cm', and particularly preferably 31 to 62 cells/cm'. The honeycomb filter 100 with this configuration can be used favorably as a filter to purify exhaust gas emitted from an automobile engine. If the cell density is too low, pressure loss may increase. On the other hand, if the cell density is too large, purification performance may be deteriorated.

Porosity of the partition walls 1 is preferably 45-65%, more preferably 46-63%, and particularly preferably 46-61%. The honeycomb filter 100 with this configuration can be used favorably as a filter to purify exhaust gas emitted from an automobile engine. The porosity of the partition walls 1 is a value measured by the mercury porosimetry. The porosity of the partition walls 1 can be measured using Autopore 9500 (product name) produced by Micromeritics Co, for example. The partition walls 1 porosity can be measured by cutting out a portion of the partition walls 1 from the honeycomb structure 4 to form a sample piece, and using the sample piece thus obtained. The porosity of the partition walls 1 is preferably constant over the entire region of honeycomb structure 4.

The shape of the cells 2 defined by the partition walls 1 is not limited especially. For example, the shape of the cells 2 in a cross section perpendicular to the extending direction of the cells 2 may be a polygon. Examples of the polygonal shape include a triangle, a quadrangle, a pentagon, a hexagon, and an octagon. Here, the shape of the cells 2 is preferably a triangle, a square, a pentagon, a hexagon, or an octagon, and more preferably a square or an octagon.

The circumferential wall 3 of the honeycomb structure 4 may be monolithic with the partition walls 1 or may be a circumference coating layer that is formed by applying a circumference coating material on the outer circumference of the partition walls 1. For example, although not shown, the circumferential coat layer can be provided on the circumferential side of the partition walls after the partition walls and the circumferential wall are integrally formed and then the formed circumferential wall is removed by a known method such as grinding, in a manufacturing process.

The shape of the honeycomb structure 4 is not limited especially. Examples of the shape of the honeycomb structure 4 include a pillar shape in which the inflow end face 11 and the outflow end face 12 have a shape such as a circle, an ellipse, or a polygon.

The size of the honeycomb structure 4, including the length from the inflow end face 11 to the outflow end face 12 and the size of a cross section perpendicular to the extending direction of the cells 2 of the honeycomb structure 4, is not limited especially. Each size may be selected as appropriate such that optimum purification performance is obtained when the honeycomb filter 100 is used as a filter for purifying exhaust gas.

The material of the partition walls 1 is not limited especially. For example, the material of the partition walls 1 may include a material containing at least one selected from the group consisting of silicon carbide, cordierite, silicon-silicon carbide composite material, cordierite-silicon carbide composite material, silicon nitride, mullite, alumina, and aluminium titanate. The partition walls 1 preferably include these materials accounting for 90 mass % or more, more preferably 92 mass % or more, and particularly preferably 95 mass % or more. The silicon-silicon carbide composite material is a composite material formed using silicon carbide as an aggregate and silicon as a bonding material. The cordierite-silicon carbide composite material is a composite material formed using silicon carbide as an aggregate and cordierite as a bonding material.

The material of the plugging portions 5 is preferably a material that is preferred as the material of the partition walls 1. The material of the plugging portions 5 and the material of the partition walls 1 may be the same or different.

In the honeycomb filter 100, the partition walls 1 defining the plurality of cells 2 is preferably loaded with a catalyst for purifying exhaust gas. Loading the partition walls 1 with a catalyst refers to coating the catalyst onto the surface of the partition walls 1 and the inner walls of the pores formed in the partition walls 1. This configuration makes it possible to turn CO, NOx, HC and the like in exhaust gas into harmless substances by catalytic reaction. In addition, the oxidation of PM of trapped soot or the like can be accelerated. In the honeycomb filter 100 of the present embodiment, it is particularly preferable that the catalyst is loaded inside the pores of the porous partition walls. With such a configuration, it is possible to achieve both improvement of trap performance and reduction of pressure loss after the catalyst is loaded in a small amount. Further, after the catalytic is loaded, the flow of gases becomes uniform and thus purification performance can be expected to be improved.

There is no particular restriction on the catalyst which is loaded on the partition walls. For example, a catalyst containing a platinum group element and containing an oxide of at least one element among aluminum, zirconium, and cerium can be exemplified.

(2) Manufacturing Method of the Honeycomb Filter:

A method for manufacturing the honeycomb filter of the present invention is not limited especially, and the honeycomb filter can be manufactured by the following method, for example. First, a plastic kneaded material for producing a honeycomb structure is prepared. Kneaded material for producing honeycomb structure can be prepared by adding, as a raw material powder, an additive such as a binder, pore former, and water to a material selected from the above-mentioned suitable materials for the partition walls, if necessarily.

Next the prepared kneaded material in this way is extruded, thereby producing a pillar-shaped honeycomb formed body having partition walls defining a plurality of cells and a circumferential wall surrounding this the partition walls. In the extrusion, a die in which slits having an inverted shape of the honeycomb formed body to be molded are provided on an extruded surface thereof for the kneaded material can be employed as a die for extrusion. In particular, it is preferable to use a die for extrusion having slits which realize the thickness $T1$ of the central partition walls $1a$ that is 0.17 to 0.32 mm and the thickness $T2$ of the outer peripheral partition walls $1b$ that is 70 to 90% of the thickness $T1$ of the central partition walls $1a$. Next, the obtained honeycomb formed body is dried by microwaves and hot air, for example.

Next, plugging portions are provided at the open ends of the cells of the dried honeycomb formed body. Specifically, for example, a plugging material which includes a raw material to form the plugging portions is prepared first. Next, a mask is applied to the inflow end face of the honeycomb formed body so as to cover the inflow cells. Next, the open ends of the outflow cells without the mask on the inflow end face of the honeycomb formed body is filled with the prepared plugging material. After that, the outflow end face of the honeycomb formed body also is filled with the plugging material at the open ends of the inflow cells similarly to the above.

Next, honeycomb formed body in which each of the plugging portion is disposed on one of open ends of each cell is fired to produce a honeycomb filter. The temperature and atmosphere for firing differ according to the raw material, and those skilled in the art can select the temperature and atmosphere for firing that are the most suitable for the selected material.

EXAMPLES

The following will describe in more detail the present invention by examples, but the present invention is not at all limited by the examples.

Example 1

2 parts by mass of pore former, 2 parts by mass of dispersing medium, and 7 parts by mass of an organic binder were added to 100 parts by mass of cordierite forming raw material and mixed, and then kneaded to prepare a kneaded material. As the cordierite forming raw material, alumina, aluminum hydroxide, kaolin, talc, and silica were used. As the dispersing medium, water was used. As the organic binder, methylcellsulose was used. As the dispersing agent, dextrin was used. As the pore former, water absorptive polymer having the average particle diameter of 20 µm was used. In the present Example, the average particle diameter of the respective raw material is the particle size (D50) at an integrated value of 50% in the particle size distribution determined by the laser diffractometry and scattering method.

Next, the kneaded material was extruded using a die for manufacturing of a honeycomb formed body to obtain a honeycomb formed body having a round pillar shape as an overall shape. The cells of the honeycomb formed body were configured to be square.

Next, this honeycomb formed body was dried by a microwave dryer, and then was dried completely by a hot-air drier, and then both end faces of the honeycomb formed body were cut so as to have predetermined dimensions.

Next, a plugging material was prepared to form the plugging portions. Thereafter, a plugging material was used to form the plugging portions on open ends of the predetermined cells on the inflow end face of the dried honeycomb formed body and on open ends of the remaining cells on the outflow end face of the dried honeycomb formed body.

Next, the honeycomb formed body on which the respective the plugging portions were formed was subjected to degreasing and fired to produce a honeycomb filter of Example 1.

The honeycomb filter of Example 1 had a round pillar shape, where the inflow end face and the outflow end face were round. The inflow end face and the outflow end face had a diameter of 267 mm. Further, the length of the cells of the honeycomb filter in the extending direction was 178 mm. In the honeycomb filter of Example 1, the thickness $T1$ of the central partition walls was 0.26 mm, and the thickness $T2$ of the outer peripheral partition walls was 0.19 mm. The thicknesses of the respective partition walls are shown in Table 1. The "thickness $T1$ of the central partition walls" and the "thickness $T2$ of the outer peripheral partition walls" were measured in accordance with the above-described measuring methods. The ratio of the thickness $T2$ of the outer peripheral partition walls to the thickness $T1$ of the central partition walls (i.e., $T2/T1 \times 100\%$) was 73%. The result is shown in the column "Thickness ratio of partition walls ($T2/T1 \times 100\%$)" in Table 1. The outer peripheral portion where the thickness $T2$ of the outer peripheral partition walls is 0.19 mm was 11% of the radius r which is from the center of gravity O of the cross section to the outer peripheral edge, starting from the outer peripheral edge of the cross section of the honeycomb structure. The result is shown in the column "Existence range of outer peripheral portion in terms of r" in Table 1.

In addition, in the honeycomb filter of Example 1, the partition walls constituting the honeycomb structure had a porosity thereof of 52% and a cell density thereof of 47 cells/cm$^2$. Table 1 shows the results. The porosity of the partition walls was measured using Autopore 9500 (product name) produced by Micromeritics.

TABLE 1

|  | Thickness T1 of central partition walls (mm) | Thickness T2 of outer peripheral partition walls (mm) | Thickness ratio of partition walls (T2/T1 × 100%) (%) | Existence range of outer peripheral portion in terms of r (%) | Cell density (cells/cm$^2$) | Porosity (%) | Pressure loss Judgment | Purification Performance Judgment |
|---|---|---|---|---|---|---|---|---|
| Comparative Example 1 | 0.26 | 0.26 | 100 | 0 | 47 | 52 | Standard | Standard |
| Comparative Example 2 | 0.26 | 0.24 | 92 | 5 | 47 | 50 | Failing | Failing |
| Comparative Example 3 | 0.26 | 0.23 | 88 | 13 | 47 | 48 | Passing | Failing |
| Comparative Example 4 | 0.26 | 0.18 | 69 | 7 | 54 | 44 | Good | Failing |
| Comparative Example 5 | 0.33 | 0.26 | 79 | 9 | 47 | 62 | Failing | Passing |
| Comparative Example 6 | 0.31 | 0.27 | 87 | 5 | 29 | 55 | Failing | Good |
| Example 1 | 0.26 | 0.19 | 73 | 11 | 47 | 52 | Passing | Passing |
| Example 2 | 0.25 | 0.21 | 84 | 9 | 31 | 60 | Excellent | Excellent |
| Example 3 | 0.24 | 0.18 | 75 | 6 | 38 | 54 | Excellent | Good |
| Example 4 | 0.2 | 0.18 | 90 | 8 | 62 | 61 | Passing | Excellent |
| Example 5 | 0.28 | 0.24 | 86 | 8 | 31 | 46 | Excellent | Passing |
| Example 6 | 0.26 | 0.19 | 73 | 12 | 38 | 52 | Good | Good |

The honeycomb filters of Example 1 were evaluated for "pressure loss" and "purification performance" in the following manner. Table 1 shows the results.

[Pressure Loss]

The pressure difference between the inflow end face of the honeycomb filter and the outflow end face of the honeycomb filter was measured when air was flown through the honeycomb filter from the inflow end face thereof so that flow rate was 20 Nm$^3$/min. The measured pressure difference was defined as pressure loss of the honeycomb filter, and each honeycomb filter of Examples and Comparative Examples was evaluated based on the following evaluation criteria. In the following criteria, "pressure loss ratio (%)" refers to the ratio (%) of pressure loss of the honeycomb filter when pressure loss of the honeycomb filter of Comparative Example 1 is defined as 100%.

Evaluation "excellent": When pressure loss ratio (%) is 80% or less, it is "excellent".
Evaluation "good": When pressure loss ratio (%) is more than 80% and not more than 90%, it is "good".
Evaluation "passing": When pressure loss ratio (%) is more than 90% and not more than 100%, it is "passing".
Evaluation "failing": When pressure loss ratio (%) exceeds 100%, it is "failing".

[Purification Performance]

First, test gas containing NOx was caused to flow into the honeycomb filter. Thereafter, NOx of the gas discharged from the honeycomb filter was analyzed by a gas analyzer. The temperature of the test gas flowing into the honeycomb filter was 200° C. The temperature of the honeycomb filter and the test gas was adjusted by a heater. The heater was an infrared image furnace. As the test gas, a gas obtained by mixing 5% by volume of carbon dioxide, 14% by volume of oxygen, 350 ppm (by volume) of nitrogen monoxide, 350 ppm (by volume) of ammonia, and 10% by volume of water with nitrogen was used. In order to use the test gas, the water and a mixed gas obtained by mixing the other gases except the water were prepared separately, and the water and the mixed gas were mixed in a pipe when the test was performed. As the gas analyzer, "MEXA9100EGR (trade name) manufactured by HORIBA Corporation" was used. Further, the space velocity when the test gas flows into the honeycomb filter was set to 100,000 (time$^{-1}$). An NOx purification rate of the honeycomb filter was measured from NOx of the test gas and NOx of the gas discharged from the honeycomb filter. Then, a purification performance ratio (%) of each honeycomb filter was calculated, and each honeycomb filter of Examples and Comparative Examples was evaluated based on the following evaluation criteria. In the following criteria, the "the purification performance ratio (%)" refers to a ratio (%) of the NOx purification rate of each honeycomb filter when the NOx purification rate of the honeycomb filter of Comparative Example 1 is defined as 100%.

Evaluation "excellent": When the purification performance ratio (%) is 110% or more, it is "excellent".
Evaluation "good: When the purification performance ratio (%) is 105% or more and less than 110%, it is "good".
Evaluation "passing": When the purification performance ratio (%) is 100% or more and less than 105%, it is "passing".
Evaluation "failing": When the purification performance ratio (%) is less than 100%, it is "failing".

Example 2 to 6 and Comparative Examples 1 to 6

A honeycomb filter was manufactured in the same manner as the honeycomb filter of Example 1 except that the configuration of the honeycomb filter was changed as shown in Table 1.

The honeycomb filters of Example 2 to 6 and Comparative Examples 1 to 6 were also evaluated for "pressure loss" and "purification performance" in the same manner as in Example 1. Table 1 shows the results.

(Results)

It was confirmed that the honeycomb filters of Example 1 to 6 exceeded each performance of the honeycomb filter of Comparative Example 1 as a reference in the evaluations of pressure loss and purification performance.

In the honeycomb filter of Comparative Example 2, the partition walls thickness was 92%, and the difference between the thickness of the central partition walls and the thickness of the outer peripheral partition walls was very small. In the honeycomb filter of Comparative Example 2, also the existence range of the outer peripheral portion was 5% which was also very narrow. In the honeycomb filter of Comparative Example 2, each of pressure loss and purification performance was evaluated as "failing".

In the honeycomb filter of Comparative Example 3, the existence range of the outer peripheral portion was 13% which is very wide. In the honeycomb filter of Comparative Example 3, purification performance was evaluated as "failing".

In the honeycomb filter of Comparative Example 4, the partition walls thickness was 69%, and the differences between the thickness of the central partition walls and the thickness of the outer peripheral partition walls were very large. In the honeycomb filter of Comparative Example 4, purification performance was evaluated as "failing".

In the honeycomb filter of Comparative Example 5, the thickness T1 of the center the partition walls was 0.33 mm which was too thick, and thus the pressure loss was evaluated as "failing".

In the honeycomb filter of Comparative Example 6, the existence range of the outer peripheral portion was 5% which was narrow. In the honeycomb filter of Comparative Example 6, pressure loss was evaluated as "failing".

INDUSTRIAL APPLICABILITY

The honeycomb filter of the present invention can be used as a filter to trap particulate matter in exhaust gas.

DESCRIPTION OF REFERENCE NUMERALS

1: partition wall, 1a: central partition wall, 1b: outer peripheral partition wall, 2: cell, 2a: inflow cell, 2b: outflow cell, 3: circumferential wall, 4: honeycomb structure, 5: plugging portion, 11: inflow end face, 12: outflow end face, 15: central portion, 16: outer peripheral portion, 100: honeycomb filter, T1: thickness (thickness of the central partition walls), and T2: thickness (thickness of the peripheral partition walls).

What is claimed is:

1. A honeycomb filter comprising:
   a honeycomb structure that is pillar-shaped and has porous partition walls disposed so as to surround a plurality of cells each of which serves as a fluid through channel extending from an inflow end face of the honeycomb structure to an outflow end face of the honeycomb structure, and
   plugging portions that are disposed at any one of ends on the inflow end face and ends on the outflow end face, of the plurality of cells, wherein,
   in a cross section perpendicular to an extending direction of the plurality of cells, the honeycomb structure includes a central portion including a center of gravity O of the cross section, and an outer peripheral portion located outside of the central portion,
   a thickness T1 of the partition walls in the central portion is 0.20 to 0.28 mm,
   a thickness T2 of the partition walls in the outer peripheral portion is 73 to 90% of the thickness T1 of the partition walls in the central portion,
   the outer peripheral portion extends from an outer peripheral edge of the cross section of honeycomb structure by 6 to 12% of a radius r which is from the center of gravity O of the cross section to the outer peripheral edge,
   wherein the honeycomb structure has a cell density of 31 to 38 cells/cm$^2$, and
   wherein a porosity of the partition walls is 52 to 60%.

* * * * *